(12) United States Patent
Schwinn et al.

(10) Patent No.: US 7,645,190 B2
(45) Date of Patent: Jan. 12, 2010

(54) COMBINE CLEANING FAN CONTROL SYSTEM

(75) Inventors: Kevin S. Schwinn, Orion, IL (US); J. Bradley Lukac, Chicago, IL (US)

(73) Assignee: CNH America LLC, New Holland, PA (US)

( * ) Notice: Subject to any disclaimer, the term of this patent is extended or adjusted under 35 U.S.C. 154(b) by 330 days.

(21) Appl. No.: 11/444,227

(22) Filed: May 30, 2006

(65) Prior Publication Data

US 2007/0281764 A1 Dec. 6, 2007

(51) Int. Cl.
*A01D 75/18* (2006.01)
(52) U.S. Cl. .............................. 460/6; 460/99
(58) Field of Classification Search .............. 460/1, 460/6, 97–100, 149
See application file for complete search history.

(56) References Cited

U.S. PATENT DOCUMENTS

| 356,967 | A |  | 2/1887 | Scott |  |
|---|---|---|---|---|---|
| 1,007,970 | A |  | 11/1911 | Pella |  |
| 1,237,896 | A |  | 8/1917 | Hager |  |
| 3,213,857 | A |  | 10/1965 | Ashton et al. | 130/27 |
| 3,514,929 | A | * | 6/1970 | Cornish et al. | 460/6 |
| 4,348,855 | A |  | 9/1982 | DePauw et al. | 56/10.2 |
| 4,466,230 | A |  | 8/1984 | Osselaere et al. | 56/10.2 |
| 4,589,425 | A | * | 5/1986 | Mitchell, Jr. | 460/99 |
| 5,359,836 | A | * | 11/1994 | Zeuner et al. | 56/10.2 E |
| 5,666,793 | A |  | 9/1997 | Bottinger | 56/10.2 R |
| 5,775,072 | A |  | 7/1998 | Herlitzius et al. | 56/10.2 R |
| 6,036,597 | A | * | 3/2000 | Arner | 460/6 |
| 6,119,442 | A |  | 9/2000 | Hale | 56/10.2 H |
| 6,431,981 | B1 | * | 8/2002 | Shinners et al. | 460/6 |
| 6,475,082 | B2 | * | 11/2002 | Visagie | 460/45 |
| 6,553,311 | B2 |  | 4/2003 | Ahearn et al. | 701/213 |
| 6,591,145 | B1 |  | 7/2003 | Hoskinson et al. | 700/28 |
| 2003/0130019 | A1 |  | 7/2003 | Mammen et al. | 460/101 |

* cited by examiner

*Primary Examiner*—Alicia M Torres
(74) *Attorney, Agent, or Firm*—Michael G. Harms; John William Stader; Patrick M. Sheldrake (57) ABSTRACT

A method and a system for varying the rotational fan speed of a combine cleaning system in response to the amount of crop entering the combine cleaning system. Increases and decreases in crop material entering the cleaning system are sensed prior to their arrival at the cleaning system, and cleaning fan speed is adjusted appropriately and contemporaneously with the crop material's presence in the cleaning system.

2 Claims, 7 Drawing Sheets

COMBINE CLEANING FAN CONTROL SYSTEM

TECHNICAL FIELD

This invention relates generally to agricultural harvesting machine control systems, and more particularly, to a rotational speed control system operable for controlling fan speed for a cleaning fan of a combine responsive to certain sensed parameters representative of the amount of crop material entering the cleaning system.

BACKGROUND ART

Agricultural combines typically include a cleaning system below and rearward of the threshing unit. The cleaning system includes a cleaning fan oriented horizontally and transversely across the combine to create airflow through one or more sieves.

Crop material is deposited on the sieves for pneumatic and mechanical separation. The amount of air required for pneumatic separation depends on many factors, such as grain type, grain test weight, and grain throughput. The rotational speed of a combine cleaning fan is typically variable to allow changing air velocities as required to clean the various seed sizes and weights harvested by a combine. In addition, when more crop is present, it is typically desirable to increase the cleaning fan rotational speed, and when less crop is present, it is desirable to decrease cleaning fan rotational speed.

Combine cleaning fans are either hydraulically driven or belt driven. With a hydraulic drive, electric current to a solenoid valve is controlled to vary the oil flow to the hydraulic motor. With a belt drive, an electric motor varies the pitch diameter of the driver sheave to control the cleaning fan. When a controller controls the current to either the solenoid valve or electric motor, the cleaning fan speed can be sped up when high throughputs are entering the combine and slowed down when lower throughputs are entering the combine.

The combine's crop throughput will typically change within a given field or swath of field due to a variety of causes, for instance, changes in terrain, differing plant populations, or simply exiting and entering the crop row at the ends of the field. It would therefore be desirable to vary the rotational fan speed in real time in response to the varying conditions, such as crop density and the like. Many systems presently in use do not vary cleaning fan rotational speed in real time. The speed is set at the start based on an estimate of the crop throughput, and the speed is adjusted when detected grain loss is outside the tolerable limits.

Known control systems that can vary the rotational speed of the cleaning fan responsive to changing conditions, such as disclosed in Hoskinson et al., U.S. Pat. No. 6,591,145, adjust the cleaning fan speed based on outputs of grain loss sensors at the rear of the combine. This system monitors the grain ejected from the system, and at some pre-determined unacceptable grain loss level, adjusts the cleaning fan rotational speed. However, it must be emphasized that this system measures grain loss after it has already been lost by the combine. That is, this system requires a level of grain loss prior to making adjustments to cleaning fan speed because it only monitors the grain leaving the system. Rather than anticipating a situation in which grain may be lost, known control systems such as this only adjust cleaning fan speed after valuable crop has been lost.

It is desirable to adjust the cleaning fan speed based on the amount of crop entering the combine cleaning system rather than the crop already lost by the system. Thus, what is sought is a device that can sense the amount of crop material about to enter into the cleaning system and adjust the cleaning fan rotational speed to the amount of crop material moving through the system, which is simple and easy to operate and otherwise overcomes one or more of the shortcomings set forth above.

SUMMARY OF THE INVENTION

Disclosed is a method and a system for varying the rotational speed of a fan of a cleaning system of a combine in response to changes in the amount of crop material entering the cleaning system. Varying the cleaning fan speed responsive to incoming amounts of crop material will aid in separation of grain from chaff and thereby minimize grain loss.

According to a preferred aspect of the invention, information representative of the amount of crop entering the combine is sensed, automatically on an ongoing basis, which information is communicated to a controller. In response to an indication of an increase in crop material entering the combine, in real time, the controller automatically increases the rotational speed of the cleaning fan, preferably in proportion to the amount of the increase in incoming crop material. In response to a decrease in crop material entering the combine, in real time, the controller decreases the rotational speed of the cleaning fan, also preferably in proportion to the amount of the decrease in incoming crop material.

Preferred apparatus of the system and method includes one or more sensors for sensing the information representative of the amount of crop entering the combine cleaning system. This information is derived from sources, which include, but are not limited to, the torque on the header drive shaft; the load on the feeder drum pin; the position of the arm supporting the feeder drum; the displacement of the concave relative to the rotor and related strain on the structure supporting the concave; the position of the arms that hold the feeder drum; and the header position or angle.

The input signal to the controller can be from a strain gauge on the concave hanger strap and/or feeder pivot pin, torque sensed on a header drive shaft, and/or from a potentiometer indicating the position of the arms holding the feeder drum. The input to the controller can also or alternatively be the feeder/header position or angle to indicate when crop throughput will be getting lighter in the case of raising the header or throughput getting heavier in the case of lowering the header.

DETAILED DESCRIPTION OF THE INVENTION

Figure 1:
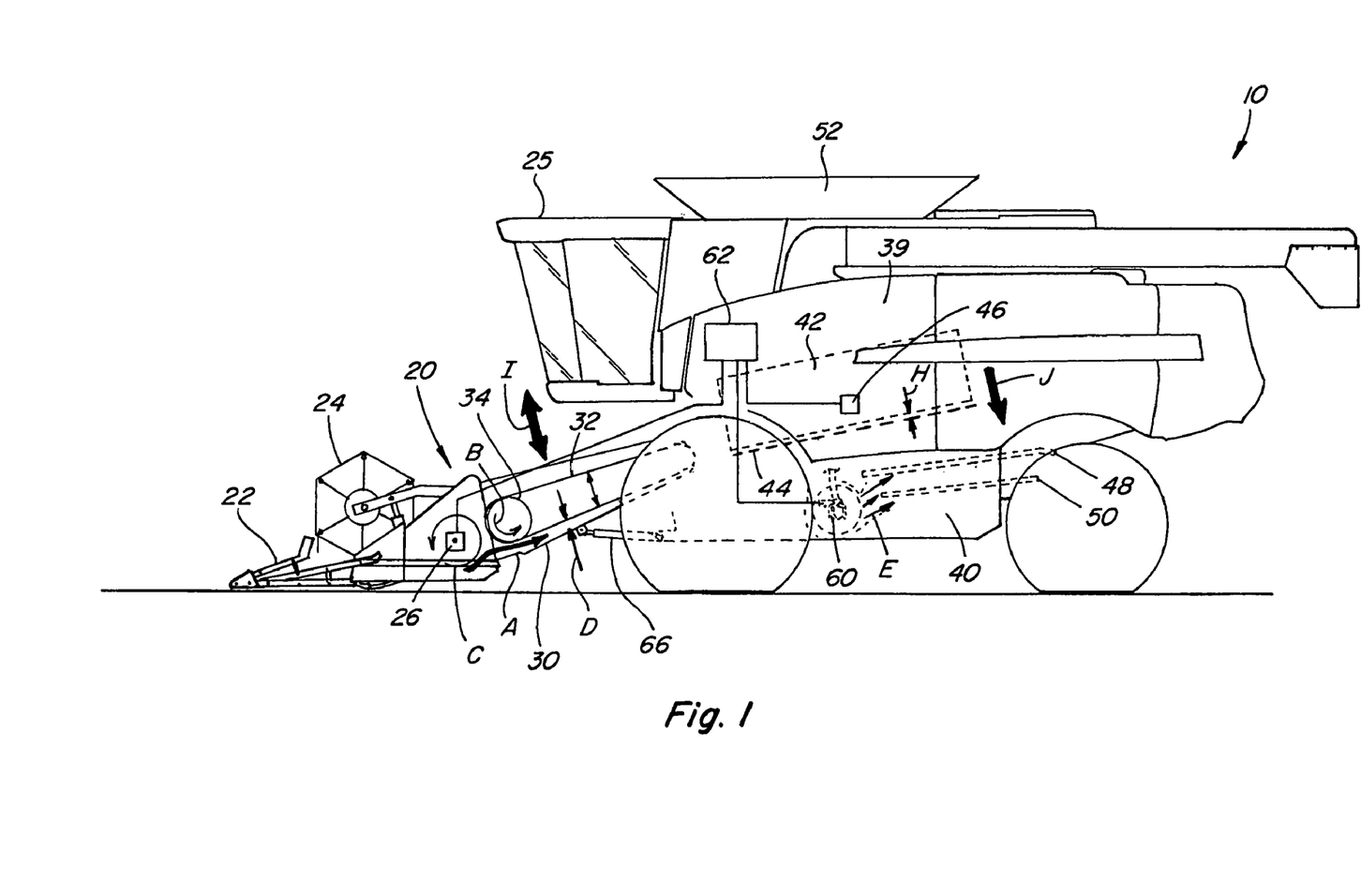
FIG. 1 is a simplified side view of a combine.
Figure 2:
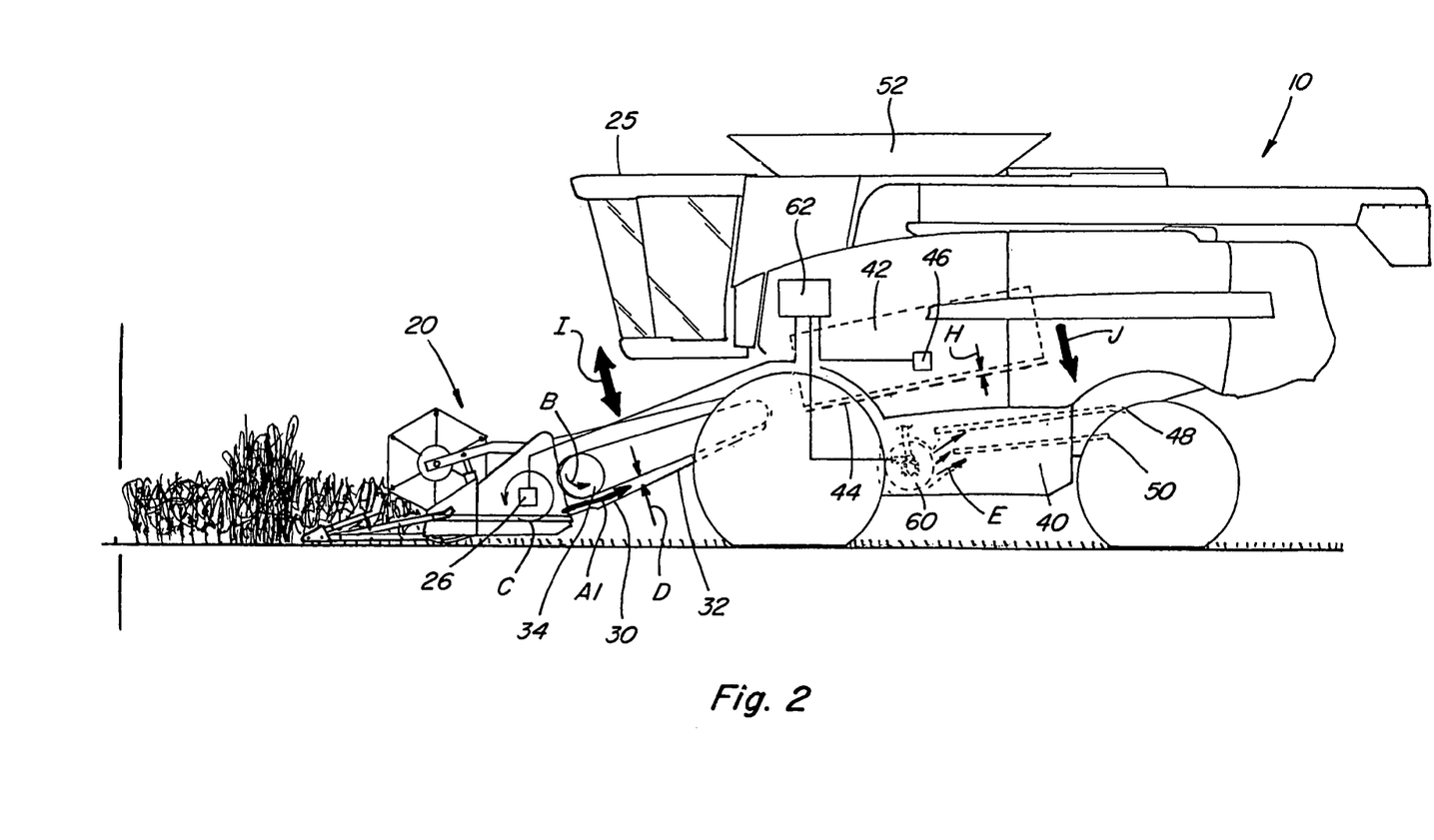
FIG. 2 is a simplified side view of the combine of FIG. 1 harvesting a densely populated area of a field.
Figure 3:
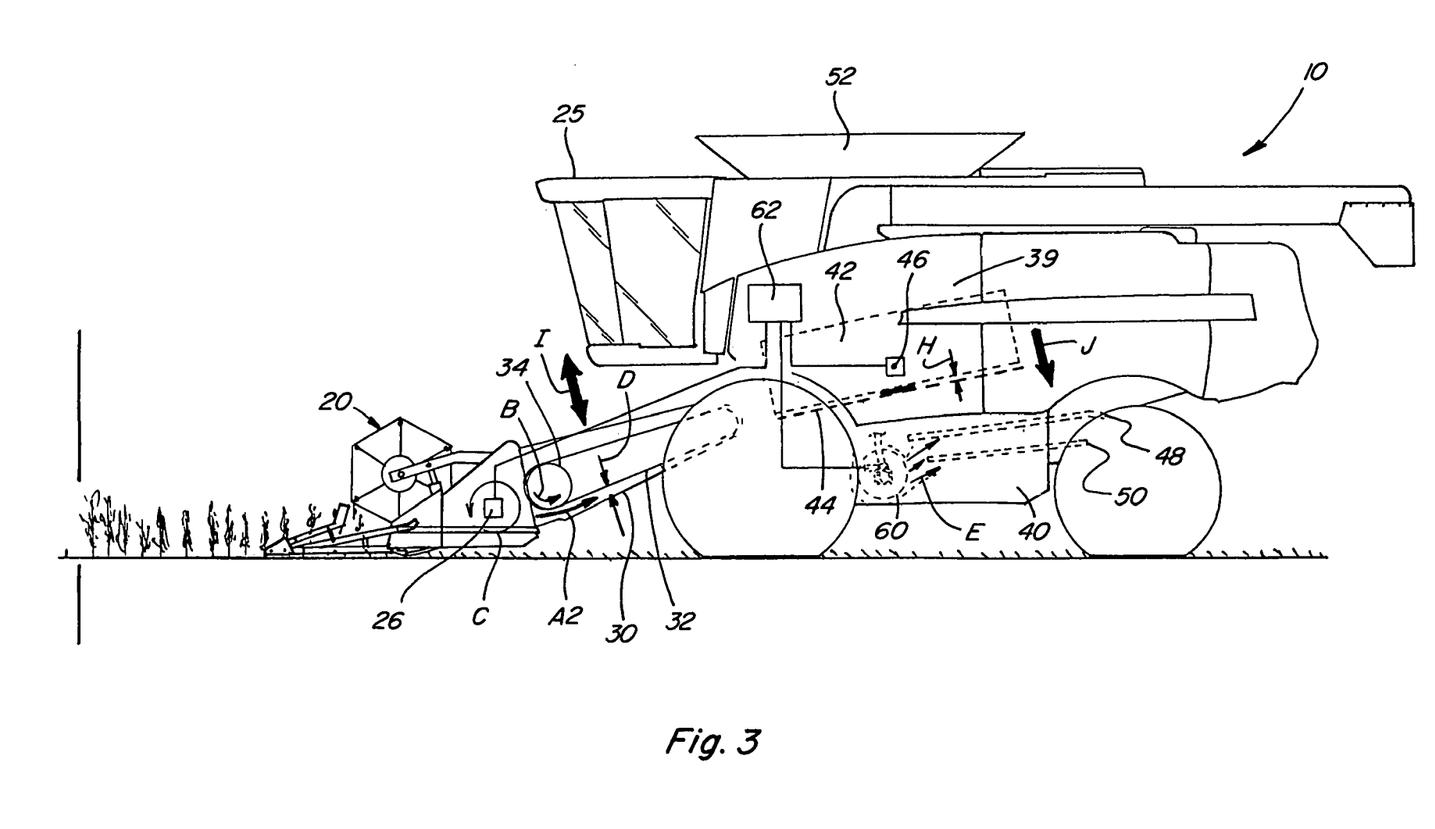
FIG. 3 is a simplified side view of the combine of FIG. 1 harvesting a sparsely populated area of a field.

Referring now to the drawings, wherein like numbers refer to like parts, FIGS. 1, 2, and 3 depict a combine 10 with a header 20 including crop dividers 22 and a reel 24. Generally crop material enters combine 10, as shown by arrows A, A1, and A2, after it is severed and gathered by header 20, through a feeder housing 30 wherein the material is carried along by a feeder chain 32 that rotates around a drum 34 turning in the direction shown by arrows B as driven by a drive mechanism 37. Feeder chain 32 moves crop material towards a threshing or separating system 39 which includes a rotor 42 and a concave 44. Separating system 39 separates the grain and other smaller elements of the crop material from larger elements such as stalks, leaves, and straw, referred to collectively as straw, and directs the grain and other smaller crop material elements to a cleaning system 40 including a chaffer 48, a sieve 50, and an adjustable speed cleaning fan 60, operable for generating a flow of air, denoted by arrows E, upwardly and rearwardly through chaffer 48 and sieve 50. Clean grain from sieve 50 is deposited on a clean grain pan and then carried by a clean grain elevator (not shown) to a grain tank 52, and chaff is expelled from the rear of the combine. Combine 10, including cleaning system 40, works to separate or clean grain from chaff with the goal of maximizing the amount of clean grain deposited in the clean grain tank 52, and minimizing the amount of grain expelled from the rear of combine 10, in the well known manner.

According to the invention, a cleaning fan control system (CFCS) 25 automatically and continuously adjusts the speed of cleaning fan 60 based on the amount of crop material entering or within cleaning system 40. Generally, CFCS 25 provides an increase in air flow E corresponding to an increase in crop material throughput, and a decrease in air flow corresponding to a decrease in throughput, in real time, as the crop material is entering the cleaning system. This is in contrast to the known systems' ability to automatically vary fan speed responsively to throughput leaving the cleaning system.

As a result, when combine 10 enters an area with more dense crop population, as shown in FIG. 2, more crop material enters header 20 and ultimately reaches cleaning system 40. Before, or as, this increased volume of crop material enters the cleaning system, a controller 62 of CFCS 25 will automatically increase the speed of cleaning fan 60 to increase air flow E to help separate the increased amount of clean grain from the increased chaff. Conversely, when combine 10 enters an area with sparser crop population, as shown in FIG. 3, less crop material enters header 20 and ultimately reaches cleaning system 40. Correspondingly, controller 62 of CFCS 25 will automatically decrease the speed of cleaning fan 60 appropriately to handle the lesser amount of grain and chaff to minimize the clean grain loss.

CFCS 25 is operable for determining the amount of crop material ready to enter, or the amount of crop material moving through, cleaning system 40 using one or more sensors. These sensors should be reliable in harvesting conditions and can include, but are not limited to, a header drive torque sensor, and/or a strain gauge sensor or sensors for measuring the strain condition at the feeder drive mechanism pivot pin and/or at the concave hanger strap.

Figure 4:
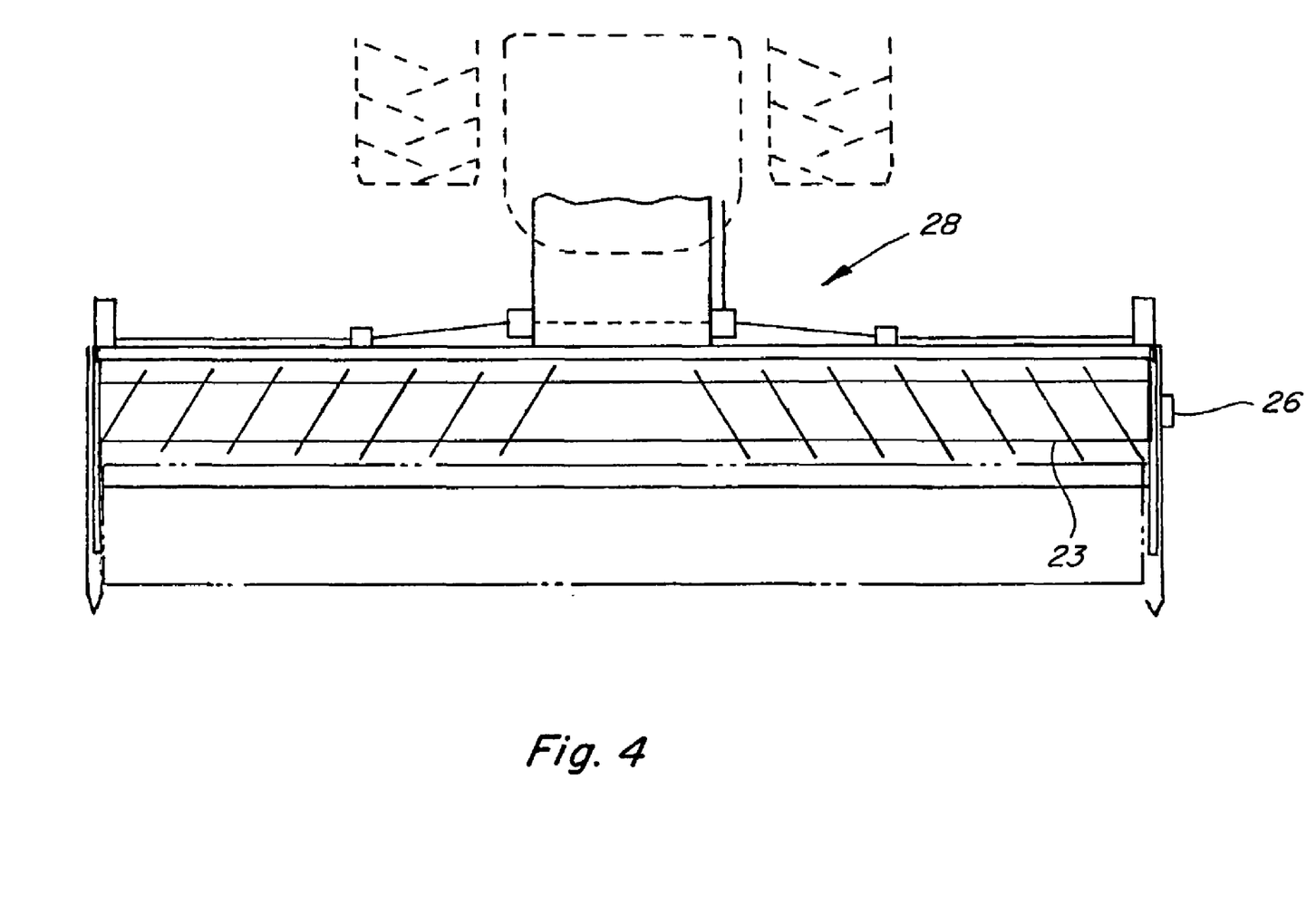
FIG. 4 is a top view of a drive shaft and auger of a header portion of the combine of FIG. 1.

For instance, in one aspect of the invention, a torque sensor 26, as shown in FIGS. 1 and 4, measures the torque, denoted by arrow C (FIGS. 1, 2, and 3), associated with a load on a drive shaft 28 for powering header 20 as crop material is drawn into combine 10 by an auger 23 of header 20. When combine 10 enters an area of increased crop population (FIG. 2), more crop material must be collected, increasing the mass of material that must be transported by auger 23, thereby increasing the load on drive shaft 28. Therefore when more crop material enters header 20, moving toward feeder chain 32 and separating system 39, and thus is about to enter cleaning system 40, torque sensor 26 senses an increased load on drive shaft 28. When the information associated with the increased load on drive shaft 28 is communicated to controller 62 of CFCS 25, controller 62 operates to correspondingly automatically increase the rotational speed of cleaning fan 60 to increase the amount of air flow E within cleaning system 40. Alternately, when combine 10 enters an area of lower crop population (FIG. 3), less crop material will be collected, decreasing the mass of material that is transported by auger 23, thereby decreasing the load on drive shaft 28. Therefore, when less crop material enters header 20, moving toward feeder chain 32 and separating system 39, and about to enter cleaning system 40, torque sensor 26 will sense a decreased load on drive shaft 28. When the information associated with the decreased load on drive shaft 28 is communicated to controller 62 of CFCS 25, controller 62 operates to automatically decrease the rotational speed of cleaning fan 60 to decrease the amount of air flow E within cleaning system 40. The amount of the fan speed increase or decrease, and the timing of the implementation thereof, will be coordinated with the arrival of the increased or decreased crop at cleaning system 40, so as to occur in real time with the increase/decrease in crop load. This will happen on a continuous basis during the operation of cleaning system 40, as controlled by CFCS 25 of the invention.

Figure 5:
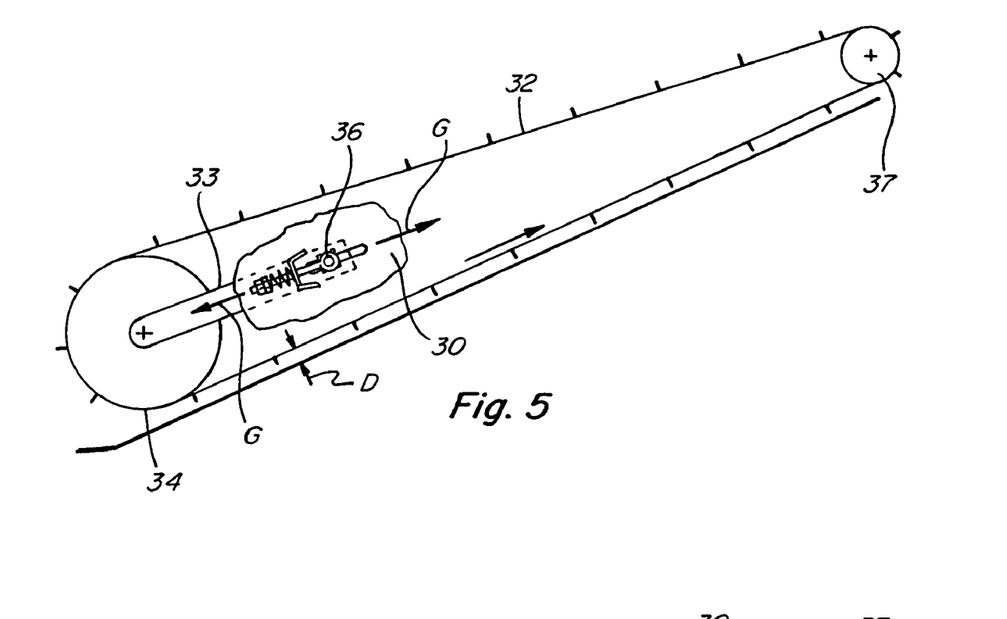
FIG. 5a is side view of a feeder of the combine of FIG. 1, showing a feeder chain of the feeder in relation to a floor of the feeder.
Figure 6:
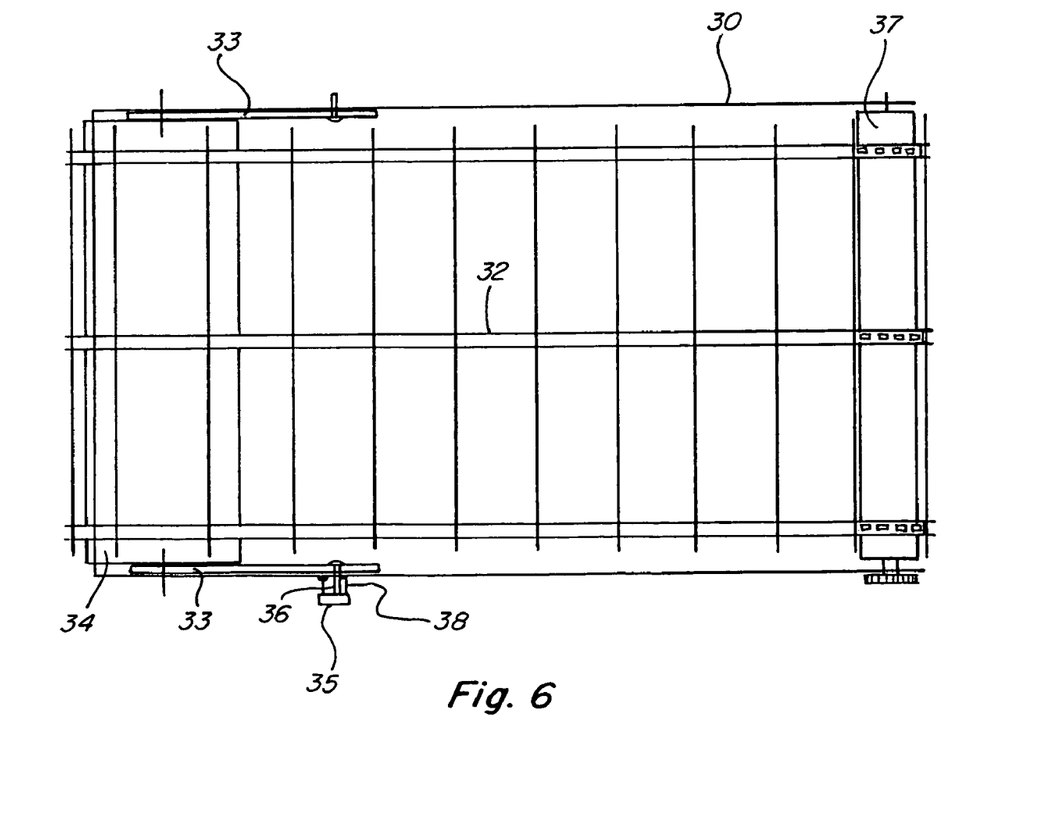
FIG. 6 is a top view of the feeder of the combine of FIG. 1.
Figure 7A:
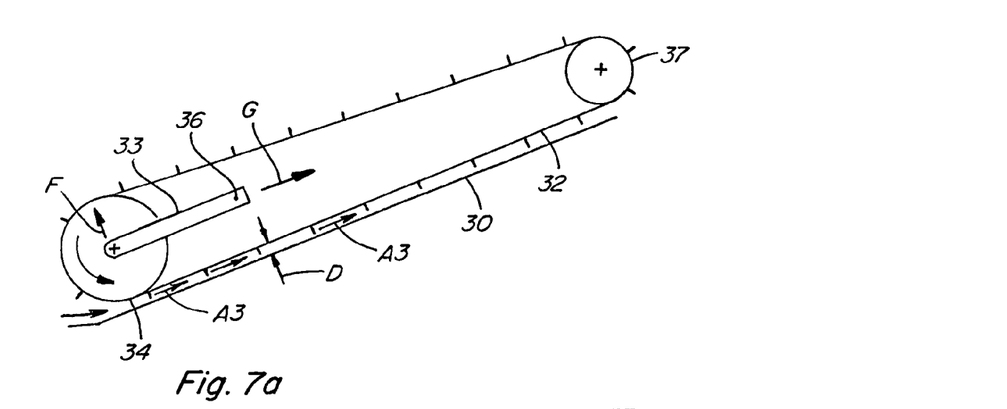
FIG. 7a is a simplified side view of the feeder of the combine of FIG. 1 showing the feeder chain and drum position for one amount of crop material entering a feeder housing of the feeder.
Figure 7B:
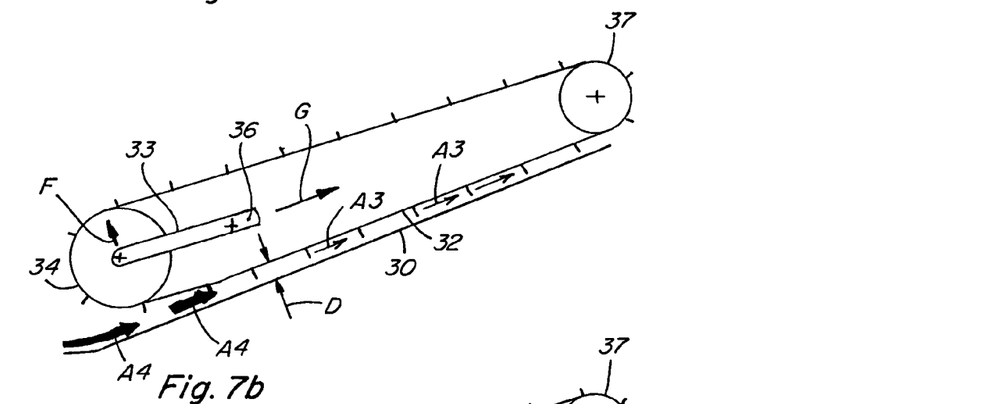
FIG. 7b is a side view of the feeder of the combine of FIG. 1 showing the feeder chain and drum position for an increased amount of crop material entering the feeder housing of the feeder.
Figures 7C, 8:
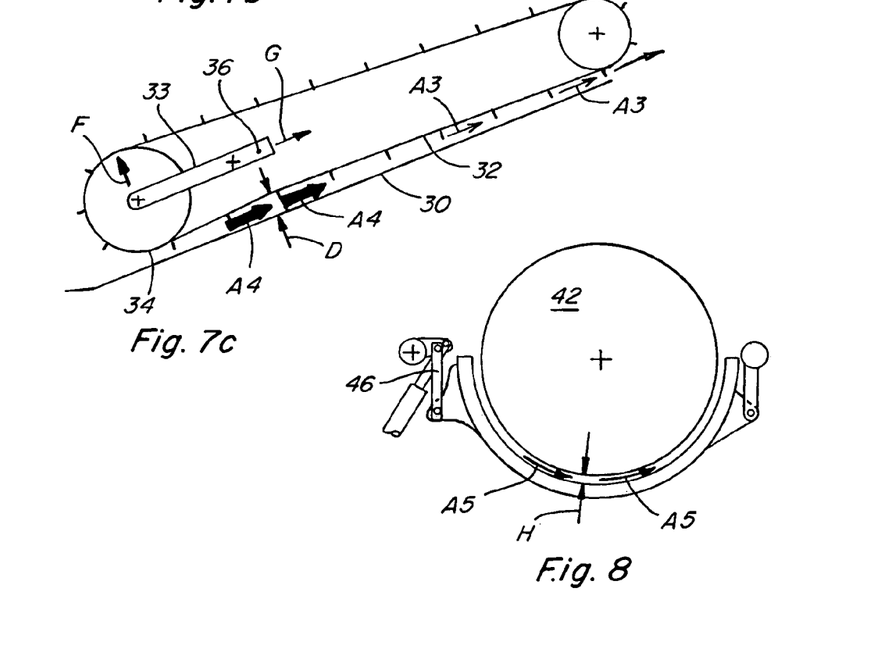
FIG. 7c is a side view of the feeder of the combine of FIG. 1 showing the feeder chain and drum position for an increased amount of crop material as it moves through the feeder housing of the feeder.
FIG. 8 is a simplified end view of a rotor and concave of the combine of FIG. 1.

Another aspect of the invention uses a strain gauge 38 in connection with a feeder drum pivot pin 36 as shown in FIGS. 5 and 6 for monitoring load conditions thereon indicative of incoming crop loads, again, on a continuous basis during operation of combine 10. Again, crop material moves through feeder housing 30 carried by feeder chain 32 within a space denoted by arrows D. FIG. 7a shows feeder chain 32 moving the crop material, denoted by arrow A3, through feeder housing 30. FIG. 7b shows an increase in crop material, denoted by arrow A4, entering feeder housing 30. The increased bulk of the crop material A4 pushes feeder chain 32 up as shown by an increase in the distance D between FIGS. 7a and 7b, and drum 34 moves up about feeder drum pivot pin 36 and back as denoted by arrows F and G, to accommodate the increased crop material load A4. In other words, feeder chain 32 and drum 34 pivot upwardly around feeder drum pivot pin 36 and exert an increased force against feeder drum pivot pin 36 thereby changing the loading or strain condition of pivot pin 36. FIG. 7c shows feeder chain 32 as the increased bulk of crop material A4 continues through feeder housing 30. Space D between feeder chain 32 and feeder housing 30 increases further causing feeder chain 32 and drum 34 to further pivot, in the directions denoted by arrows F and G around feeder drum pivot pin 36. Strain gauge 38 in connection with feeder drum pivot pin 36 operates to sense the strain condition associated with this pivoting movement about pivot pin 36. Controller 62 of CFCS 25 is programmed to determine when this increased crop load will enter cleaning system 40, and will automatically adjust the fan speed accordingly, on a continuous basis.

When combine 10 enters an area of increased crop population (FIG. 2), more crop enters feeder housing 30 and is moved along feeder chain 32. As explained above, feeder chain 32 and drum 34 pivot to accommodate the increased bulk of crop material moved by feeder chain 32 towards separating system 39, and thus towards cleaning system 40. Strain gauge 38 senses an increased strain condition at pivot pin 36 associated with the pivotal movement of feeder chain 32 and drum 34. When the information associated with the increased strain condition at pivot pin 36 is communicated to controller 62 of CFCS 25, controller 62 automatically operates to increase the rotational speed of cleaning fan 60 to increase the amount of air flow E within cleaning system 40. Alternately, when combine 10 enters an area of decreased crop population (FIG. 3), less crop enters feeder housing 30 and is moved along by feeder chain 32. Feeder chain 32 and drum 34 pivot back, opposite of directions F and G, to their original positions as shown in FIG. 7a. Strain gauge 38 resultantly senses a decreased strain condition at pivot pin 36. When the information associated with the decreased strain condition at pivot pin 36 is communicated to controller 62 of CFCS 25, controller 62 automatically operates to decrease the rotational speed of cleaning fan 60 to decrease the amount of air flow E, within cleaning system 40.

An alternate or additional method of sensing crop load entering combine 10 uses a potentiometer 35 in connection with feeder drum pivot pin 36 as shown in FIGS. 5 and 6 for monitoring a change in pivotal position of at least one arm 33 supporting feeder drum 34 which is indicative of volume of incoming crop loads, again, on a continuous basis during operation of combine 10. In a similar manner, as describe above, crop material moves through feeder housing 30 carried by feeder chain 32 within a space denoted by arrows D. As shown in FIG. 7b, when an increased amount of crop material enters feeder housing 30, arms 33 holding drum 34 may pivot upwardly around feeder drum pivot pin 36 to allow feeder chain 32 and drum 34 to increase the height of space D thus accommodating the increased load A4. As the increased load A4 continues through feeder housing 30 as shown in FIG. 7c, arms 33 move further in the directions F and G to allow feeder chain 32 and drum 34 to further pivot upwardly around feeder drum pivot pin 36. Potentiometer 35, in connection with feeder drum pivot pin 36, operates to sense the pivotal position of arm 33 supporting feeder drum 34 associated with this pivoting about feeder drum pivot pin 36. Controller 62 of CFCS 25 is programmed to determine when this increased crop load will enter cleaning system 40, and will automatically adjust the fan speed accordingly, on a continuous basis.

When combine 10 enters an area of increased crop population (FIG. 2), more crop enters feeder housing 30 and is moved along feeder chain 32. As explained above, arms 33 may pivotally move to allow feeder chain 32 and drum 34 to pivot to accommodate the increased bulk of crop material moved by feeder chain 32 towards separating system 39, and thus towards cleaning system 40. Potentiometer 35 operates to sense the position of arms 33 holding drum 34 associated with the pivotal movement of arms 33. When the information associated with the position of arms 33 is communicated to controller 62 of CFCS 25, controller 62 automatically operates to increase the rotational speed of cleaning fan 60 to increase the amount of air flow E within cleaning system 40. Alternately, when combine 10 enters an area of decreased crop population (FIG. 3), less crop enters feeder housing 30 and is moved along by feeder chain 32. Arms 33 may pivotally move to allow feeder chain 32 and drum 34 to pivot back to their original positions as shown in FIG. 7a. Potentiometer 35 operates to sense the position of arms 33 holding drum 34 associated with the pivotal movement of arms 33. When the information associated with the position of arms 33 is communicated to controller 62 of CFCS 25, controller 62 automatically operates to decrease the rotational speed of cleaning fan 60 to decrease the amount of air flow E, within cleaning system 40.

Yet another aspect of the invention uses a strain gauge 46 to sense a strain condition associated with an amount of crop material flowing between rotor 42 and a portion of concave 44. FIG. 8 shows an end view of rotor 42 and concave 44. In separating system 39, the crop material, denoted by arrows A5, moves through the space between rotor 42 and concave 44, denoted by arrows H. As rotor 42 turns, the crop material is carried thereby across concave 44 to separate the grain and other smaller elements of the crop material from the straw, stalks, and other longer elements. With reference to FIGS. 1, 2, and 3, grain and smaller pieces of crop material fall through concave 44 onto chaffer 48 and sieve 50. Larger pieces of crop material or straw, that do not fit through concave 42 are expelled from the rear of combine 10. Cleaning fan 60 blows air flow E across the grain and smaller chaff as it falls from concave 44 to chaffer 48 which is moving in a back and forth motion to further separate grain from chaff. Air flow E blows the lighter chaff towards the rear of combine 10, and heavier grain and remaining chaff fall through chaffer 48 to sieve 50. Sieve 50 is also moving in a back and forth motion to separate grain from chaff. Air flow E blows the separated lighter chaff towards the rear of combine 10 and allows the heavier clean grain to fall to the clean grain pan therebelow.

When combine 10 enters an area of increased crop population (FIG. 2), more crop material is collected and fed to separating system 39 into space H between rotor 42 and concave 44. The increased bulk of crop material forced into space H increases a force, denoted by arrow J, on concave 44, which increases a strain condition on strain gauge 46 associated with concave 44 or support structure therefor. When the information associated with the increased strain condition at strain gauge sensor 46 is communicated to controller 62 of CFCS 25, controller 62 responsively automatically operates to increase the rotational speed of cleaning fan 60 to increase the amount of air flow E across crop material falling from concave 44 to chaffer 48 and sieve 50. Alternately, when combine 10 enters an area of decreased crop population (FIG. 3), less crop material is collected and fed to space H between rotor 42 and concave 44. The decreased bulk of crop material entering space H decreases force J on concave 44 and decreases the strain condition on strain gauge 46 associated with concave 44. When the information associated with the decreased strain condition at strain gauge sensor 46 is communicated to controller 62 of CFCS 25, controller 62 automatically operates to decrease the rotational speed of cleaning fan 60 to decrease the amount of air flow E across crop material falling from concave 44 to chaffer 48 and sieve 50.

In another aspect of the invention, the rotational speed of cleaning fan 60 can be varied in response to the header 20/feeder housing 30 position or angle commanded by the operator of combine 10. Referring to FIG. 1, as combine 10 harvests a field, variations in terrain such as a dip and the like, result in controller 62 receiving information related to the changing terrain condition and automatically raising and lowering the header 20/feeder housing 30 combination in the direction shown by arrow I, as effected by hydraulic cylinder 66, to prevent damage to combine 10. In addition, a combine operator may also manually raise and lower the header 20/feeder housing 30 combination when exiting and entering a swath of crop respectively. When header 20/feeder housing 30 is lowered by the operator, indicating combine 10 is entering an area with crop population, increased crop material is anticipated to be collected at header 20 and enter cleaning system 40. Alternately, when header 20/feeder housing 30 is raised by the operator, indicating combine 10 is leaving an area of crop population, or otherwise will not be harvesting, less crop material is anticipated to be collected at header 20 and enter cleaning system 40. When controller 62 receives information indicating the operator is lowering the header 20/feeder housing 30 combination, controller 62 can operate to increase the rotational speed of cleaning fan 60 in anticipation of increased crop material entering cleaning system 40. Alternately, when controller 62 receives information indicating the operator is raising the header 20/feeder housing 30 combination, controller 62 can operate to decrease the rotational speed of cleaning fan 60 in anticipation of decreased crop material entering cleaning system 40.

Variation of cleaning fan speed in reaction to an unacceptable amount of grain loss measured at the rear of combine 10, as is done in known systems, has been found to create a system in which an unacceptable amount of grain will be lost before a change in cleaning fan speed occurs. Varying the rotational speed of cleaning fan 60 in response to the amount of grain entering cleaning system 40, as is done by CFCS 25 of the invention, however, creates a system that can anticipate a condition in which unacceptable grain loss may occur and then can proactively vary cleaning fan speed to avoid the unacceptable grain loss. In addition, controller 62 operates to adjust the speed of cleaning fan 60 when the increased crop material reaches cleaning system 40. In other words, controller 62 will not immediately increase the speed of cleaning fan 60 when torque sensor 26 communicates an increase in crop material entering header 20. Instead, controller 62 will automatically increase the speed of cleaning fan 60 when the increased amount of crop material reaches cleaning system 40. In this manner, CFCS 25 receives information about the amount of crop material entering combine 10 from one or more sources, and operates to automatically adjust the speed of cleaning fan 60 to a speed proportional to the amount of crop entering cleaning system 40 contemporaneously with, or just before, the arrival of the crop material at cleaning system 40. One or more of the sensors 26, 38, and 46 can be used, either alone or in combination, to provide the required crop load information, and verify that information. For instance, if crop material load in header 20 is sensed using torque sensor 26, any of the other sensors 38 or 46 can be used to verify the load change and/or arrival time of the crop material at cleaning system 40.

Figure 9:
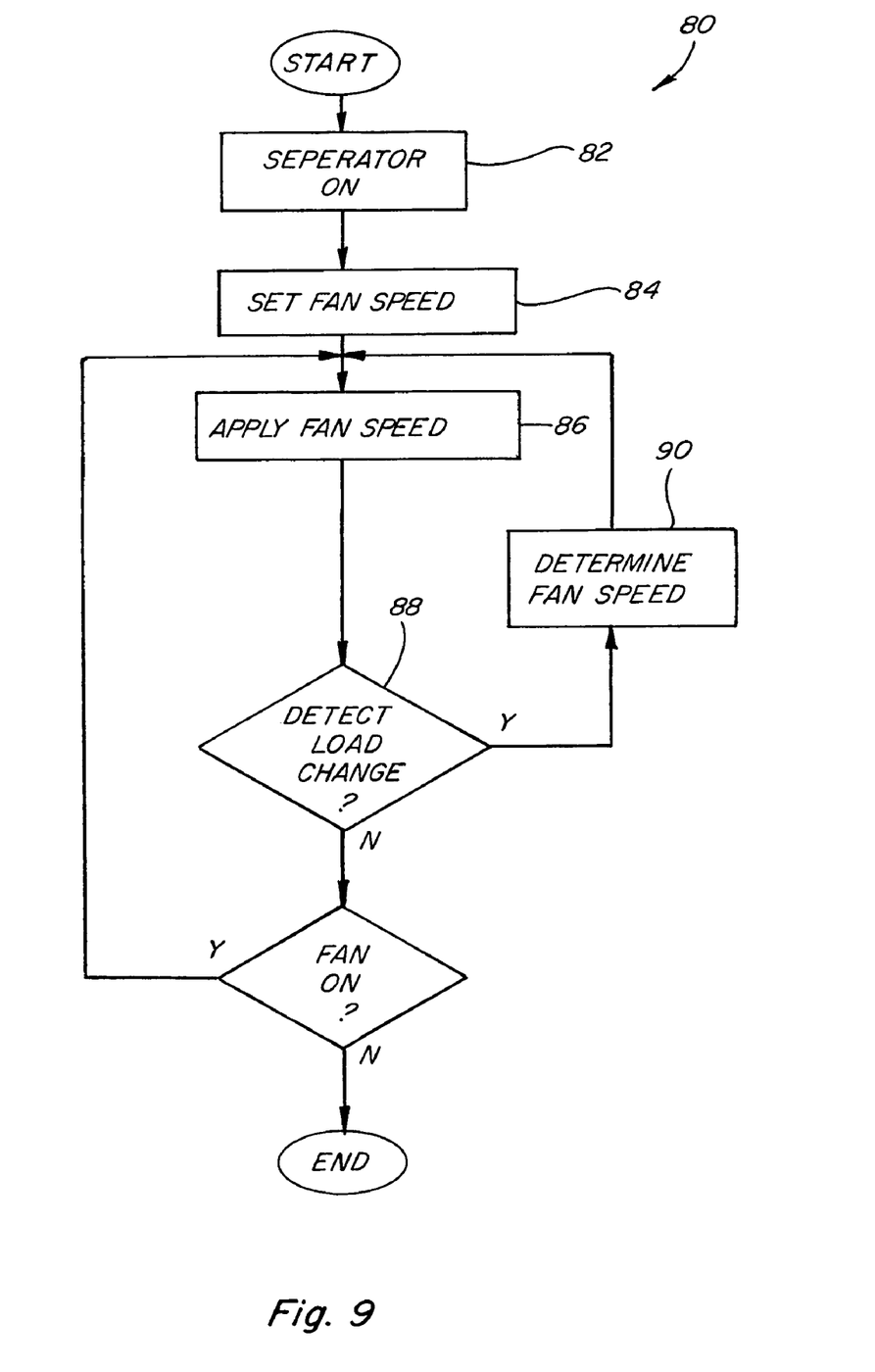
FIG. 9 is a high level diagram of steps of operation of a combine cleaning fan control system of the invention.

FIG. 9 depicts controller 62 logic flow 80. At block 82, controller 62 checks to make sure the separator system 39 is operational. At block 84 cleaning fan rotational speed is set at a nominal rotational speed, and block 86 applies the cleaning fan speed input. Block 88 is a decision block based on a change in the amount of crop entering combine 10. If a change in crop throughput is indicated, controller 62 adjusts the rotational speed of cleaning fan 60 at block 90 and applies the adjustment at block 86. If no change in the amount of crop throughput is indicated, controller 62 does not determine a cleaning fan speed adjustment and continues to monitor for a change in the amount of crop material entering combine 10.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method for controlling a rotational speed of a cleaning fan of a cleaning system of a combine, comprising steps of:
   providing an electrical sensor adjacent to a crop flow, the sensor in connection with a controller, the sensor:
   (i) sensing information representative of crop load before the crop enters the cleaning system;
   (ii) outputting information representative of crop load to the controller;
   the controller automatically:
   (i) determining information representative of a fan speed for crop load entering the cleaning system;
   (ii) outputting a signal operable for controlling rotational speed of the fan as a function of the information representative of crop load; and
   wherein the sensor is a strain gauge coupled to a portion of a concave for determining a strain condition on the portion of the concave, the strain condition on the portion of the concave representative of the crop load flowing between a space between the concave and an associated rotor.

2. A system for controlling a variable speed cleaning fan of a combine comprising:
   at least one electrical sensor adjacent a crop flow to measure crop load before the crop flow enters the cleaning system, the sensor operable for measuring information indicative of the crop load and outputting a signal indicative of the crop load, wherein the sensor comprises a strain gauge coupled to a portion of a concave for determining a strain condition on the portion of the concave, the strain condition representative of the crop load flowing between a space between the concave and an associated rotor; and
   a controller in connection with the sensor operable for receiving the signal and automatically outputting to the cleaning fan a signal indicative of a fan speed as a function of the signal indicative of the crop load.

* * * * *